United States Patent Office 3,129,562
Patented Apr. 21, 1964

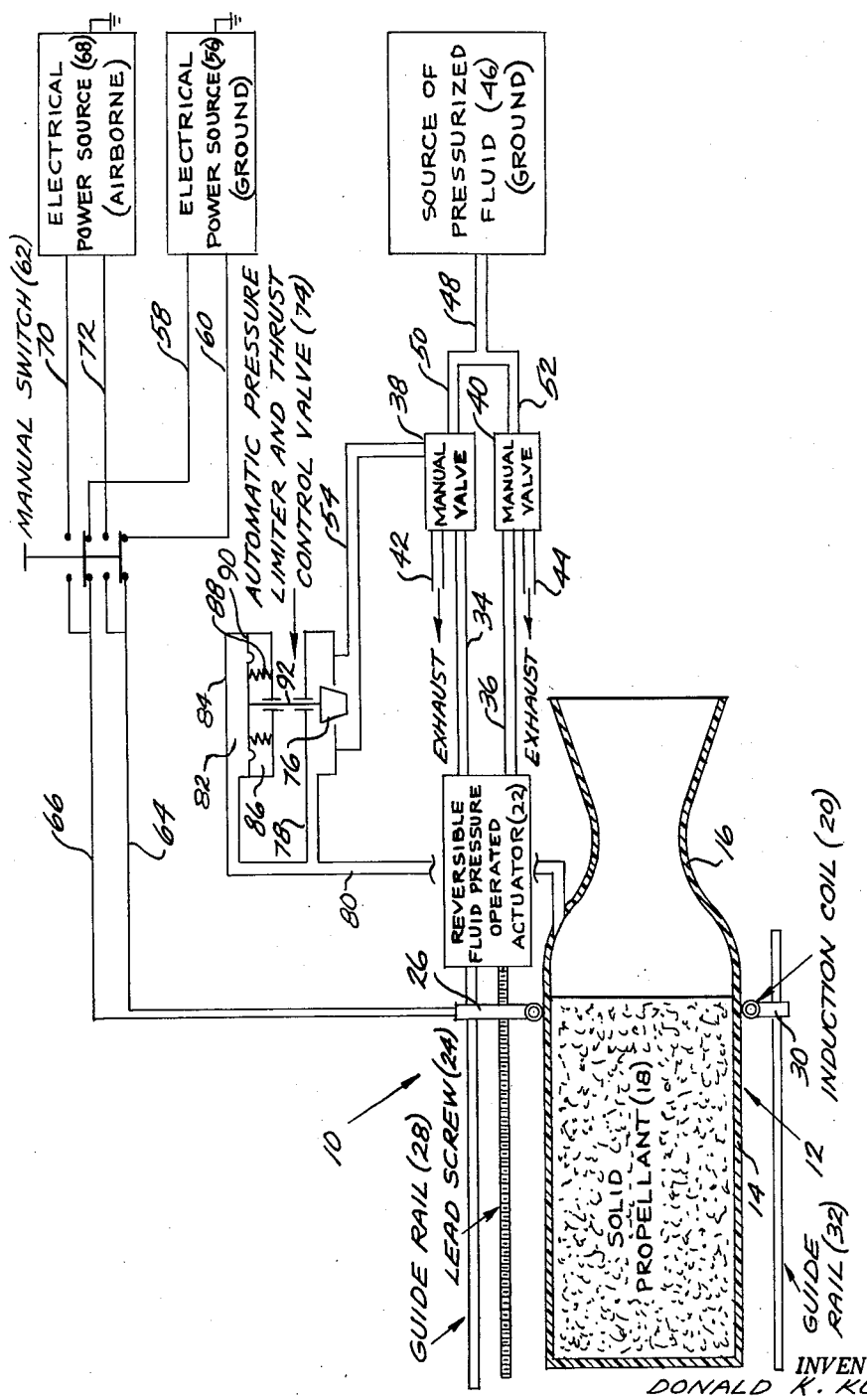

3,129,562
METHOD AND MEANS FOR IMPROVING COMBUSTION CHARACTERISTICS OF SOLID PROPELLANTS
Donald K. Kuehl, Manchester, and Richard L. Vasquez, Wethersfield, Conn., assignors to United Aircraft Corporation, East Hartford, Conn., a corporation of Delaware
Filed Oct. 21, 1960, Ser. No. 64,024
3 Claims. (Cl. 60—35.6)

This invention relates to solid propellants of the type used in rocket motors and the like and, more particularly, to a method and means for improving the combustion characteristics of such propellants. While solid propellants have several well-known characteristics which render them particularly well suited to rocket propulsion, one particular characteristic thereof gives rise to a rather serious disadvantage. That is, such propellants have a relatively slow burning rate and, in consequence, a severe limitation may be imposed on the maximum thrust obtainable from a given solid propellant rocket motor.

Various attempts have been made to overcome this inherent disadvantage of solid propellants, but none has met with complete success. In accordance with one conventional practice, a large exposed burning area of solid propellant is provided for by employing a propellant charge in a "star configuration." More specifically, a solid propellant charge is formed in a generally cylindrical shape with a star-shaped axial opening or void and combustion takes place throughout the substantial area of the walls of the opening or void. With this large combustion or burning area, desirably high levels of thrust are obtainable but the provision of the opening or void in the propellant charge also entails a serious disadvantage. The overall low density characteristics of a "hollow" or "star configuration" charge require that a charge of relatively large size be provided for a given quantity of propellant. It is of course of critical importance that excessive size and bulk be avoided in the design of rockets and similar vehicles.

It is the general object of the present invention to provide a method and means for controlling and accelerating the combustion or burning rate of a solid propellant to the end that the propulsive capabilities of a given quantity of such propellant in a solid charge may be enhanced even to equal and surpass the propulsive capabilities of a like quantity of the propellant in a "hollow" or "star configuration" charge.

The drawing shows a preferred embodiment of the means of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing is a schematic illustration of a solid propellant rocket motor and a burning rate acceleration means of the present invention.

The present invention is not limited in its application to any particular solid propellant, but is capable instead of advantageous use with any solid propellant suitable for use in rocket motors. Such propellants usually include an oxidizer and a binder (ordinarily the fuel) as principal constituents and they also include certain additives such as catalysts, inhibitors, and metallic particles. Even when such propellants contain a substantial quantity of metallic particles used for igniters or other purposes, the overall thermal conductivity of the propellants is characteristically quite low. As a result, conductive heating of the propellant beneath its burning surface is relatively slow and the progress or propagation of the flame or combustion zone into the propellant in a direction normal to the burning surface is correspondingly slow. Radiant energy from the flame itself also tends to heat and ignite the propellant beneath the burning surface, but such heating may result in uncontrolled and comparatively deep subsurface ignition causing ejection of unburned propellant and even severe explosions and destruction of the motor. It is therefore a conventional practice to darken the propellant with a substance such as carbon black to limit the penetration of radiant energy. While this may eliminate the danger of inefficient and explosive combustion, it will be apparent that it also eliminates, or at least diminishes, the possible beneficial effects of radiant energy in increasing the burning rate of the propellant.

Generally speaking, the present invention involves the acceleration of the burning rate of a charge of solid propellant by heating the charge before or after ignition, or, both before and after ignition. Solid propellants have been heated prior to ignition in the past, but the present invention contemplates a new and improved method and means for so heating the propellants. In accordance with said method, substantially all of the propellant in a charge of solid propellant is heated prior to ignition by inductively heating electrically conductive particles in the propellant. The said conductive particles may comprise metallic particles included in the propellant for other purposes or suitable particles may be added to the propellant mixture for the specific purpose of inductive heating. As will be seen, a charge of solid propellant can be preheated rapidly and uniformly without excessive temperature gradients in practicing the method of the present invention. No significant danger of premature ignition is encountered and the rocket or other vehicle powered by the propellant charge can be readied for flight in a most expeditious manner.

With regard to postignition heating of a propellant charge for the acceleration of burning rate, the present invention involves the selective heating of a burning charge adjacent a burning or combustion zone as said zone propagates through the charge. In accordance with the presently preferred practice, such postignition heating of a propellant charge is also accomplished by inductively heating electrically conductive particles in the charge to selectively heat portions or layers of the charge adjacent the propagating combustion zone. The heat added inductively to a portion or layer of a propellant charge adjacent a combustion zone may merely supplement the heat supplied to such portion or layer by conduction and radiation whereby to prepare the portion or layer for quick subsequent ignition by conduction and radiation. Alternatively, the inductively added heat may actually effect ignition which is beneath, or, in advance of, the normal combustion zone but which is controlled so as not to result in ejection of unburned propellant or dangerous explosions. In practicing the method of the present invention as it relates to postignition heating, control is exercised over the amount of heat added inductively and over the particular subsurface portion or layer of a propellant charge to which the heat is added. In consequence, the burning rate of the propellant charge can be controlled and accelerated to the maximum level permissible for safe rocket motor operation without danger of uncontrolled and possibly explosive subsurface ignition.

Referring now to FIG. 1 in particular, it will be observed that a solid propellant rocket motor is shown schematically at 10 and includes a housing or case indicated generally at 12. The housing or case 12 of the motor has an elongated generally cylindrical body section 14 which may be adapted for connection with other parts of a rocket assembly such as an upper stage, a payload, etc., and which may be formed integrally at a rear end portion with an exhaust nozzle section 16 of a conventional converging-diverging type. Disposed within the body section 14 of the housing or case is a solid generally cylindrical charge 18 of a solid propellant which has metallic or other electrically conductive particles in substantially uniform distribution throughout. The charge 18 is adapted to be ignited at a rear end portion and, when so ignited, it burns forwardly in a direction generally normal to the burning surface or combustion zone. The hot gases of combustion of course expand through the nozzle section 16 of the motor in the usual manner.

In the presently preferred form, a means for carrying out the method of the invention as it relates to both preignition and postignition heating of a propellant charge includes a multiturn induction coil as shown schematically at 20. The coil 20 takes a generally circular form as shown and is disposed around the housing or housing section 12 of the rocket motor substantially in coaxial relationship therewith. Thus, it will be seen that the coil can be energized to provide an electromagnetic flux or field in an encircled generally radially extending portion or layer of the propellant charge 18. It will be further seen that electrically conductive particles in said portion or layer of the charge can thus be inductively heated in a desired manner whereby to heat the remainder of the propellant in the portion or layer. The manner and the extent to which the conductive particles are heated will of course depend upon the characteristics of the particles themselves and upon the intensity and frequency of the electromagnetic field and it will be apparent that close control over heating can be exercised by judicious selection of the conductive particles and the electromagnetic field characteristics.

In order that the entire propellant charge 18 may be efficiently heated prior to ignition with the inductive coil 20 shown, it is necessary to provide for longitudinal or axial movement of said coil relative to the housing 12 of the rocket motor and the propellant charge 18 therein. While means for so moving the coil 20 may vary widely within the scope of the invention, a reversible fluid pressure operated actuator is preferred as indicated at 22. Said actuator may be of any well-known type adapted to provide rotary output motion in one and an opposite direction in response to and in keeping with fluid pressure signals supplied thereto. The rotary output motion of the actuator 22 is utilized to effect desired longitudinal movements of the coil 20 by means of a longitudinally extending lead screw 24 driven by the actuator 22 and a bracket 26 threadedly mounted on said lead screw and fixedly connected with the coil 20. The bracket 26 is also slidably mounted on a longitudinal support and guide rail 28 and cooperates therewith and with a similar bracket 30 associated with a support and guide rail 32 to support the induction coil 20.

From the foregoing, it will be apparent that the actuator 22 can be operated to rotate the lead screw 24 in one and an opposite direction and to thereby move the induction coil 20 longitudinally or axially forwardly and rearwardly along the housing 12. During preignition heating of the propellant charge 18, the said coil is moved throughout the length of the propellant charge 18 at least once and, preferably, several passes of the coil along the length of the charge are effected. Means for controlling the operation of the actuator 22 for the desired forward and rearward movements of the coil 20 may take a wide variety of forms, and the particular means shown and described below is merely exemplary.

First and second control or operating conduits 34 and 36 connected with the pressure operated actuator 22 extend respectively to first and second manual valves 38 and 40 having connected exhaust or vent conduits 42 and 44. The said valves are each supplied with fluid under pressure by connection with a source of pressurized fluid 46 via a main supply conduit 48 and branch conduits 50 and 52. Additionally, the first valve 38 is connected with an alternate or second supply conduit 54 for a purpose to be set forth hereinafter. The source of pressurized fluid 46 may take various forms, but preferably said source comprises a compressed gas cylinder or the like detachably connected with the supply conduit 48 and which is separate from an independent of the rocket motor and the entire rocket assembly. Said source is utilized prior to firing of the rocket and may properly be referred to as a "ground" source of pressurized fluid.

In operation of the preignition heating control means for the actuator 22, the valves 38 and 40 are manually positioned to effect actuator operation resulting in lead screw rotation and axial coil movements in the desired directions. The valve 38 may be of any well-known three position type and the valve 40 of any well-known two position type. Each of the said valves has a position wherein it serves to connect its associated control or operating conduit with the source of pressurized fluid 46 and each of said valves has another position wherein the associated control or operating conduit is exhausted or vented. Additionally, the valve 38 has a third position wherein the control conduit 34 associated therewith is connected with the alternate or second supply conduit 54. Thus, the coil 20 can be moved axially in one direction, for example forwardly, by operating the valves 38 and 40 as required to connect the control conduit 34 with the pressure source 46 and the control conduit 36 with the exhaust or vent conduit 44. Rearward movement of said coil will of course result when the said valves are operated to reverse the connections of the control conduits 34 and 36. When the valve 38 is operated to interconnect the conduits 34 and 54 and the valve 40 is operated to vent or exhaust the conduit 36, the coil 20 can be moved forwardly along the motor housing 12 but in accordance with a separate and distinct mode of system operation as will be seen.

As previously mentioned, control can be exercised over the amount of heat added to the propellant charge and the manner in which the heat is added by judiciously selecting the electrically conductive particles in the charge and the characteristics of the electromagnetic field provided by the induction coil. For preignition heating of the propellant charge, it is of course desirable to raise the temperature of the charge to as high a level as possible in the shortest possible period of time. Inadvertent ignition of the charge must, of course, be avoided and this requires that excessive localized temperatures must not occur in the charge. Inductive heating is inherently particularly well suited to these requirements. With electrically conductive particles substantially uniformly distributed throughout the charge, the heating efficiency at central portions of the charge can be made substantially equal to that at peripheral portions thereof and it is unnecessary to depend on heat conduction through the charge for heating of such central portions. In some instances it may be desirable to introduce conductive particles to the charge specifically for highly efficient preignition heating and such particles may differ substantially in character from those utilized for postignition heating, the latter being either specially added particles or metallic particles employed as igniters in the propellant. It will be apparent that electromagnetic field characteristics can be provided such that various particles differing in character will be headed selectively and such refinements fall within the scope of the invention.

In the embodiment of the invention shown, it may be assumed that metallic particles employed as igniters in the propellant charge 18 serve as the heating medium for the propellant during both preignition and postignition inductive heating. During preignition heating the said particles are heated inductively so as to heat the remainder of the propellant in the desired manner, but so that they will not ignite, by the application of an electromagnetic field of appropriate intensity and frequency. The intensity and frequency of said field of course depends upon the characteristics of the electrical power source connected with the coil 20 and a suitable power source is preferably provided separate from and independent of the rocket assembly. Such a power source is shown in block form at 56 and may be assumed to be conventional in nature. The said power source may be properly referred to as a "ground" power source as its use is limited to a period of time which precedes ignition and firing of the rocket assembly.

Lead conductors 58 and 60 from the power source 56 extend to a manual two position switch indicated generally at 62 and which serves to selectively connect said conductors to supply conductors 64 and 66 for the coil 20. The supply conductors 64 and 66 may be connected to the said coil by conventional means not shown on the aforementioned bracket 26.

Postignition heating of the propellant charge 18 in the manner mentioned above can be accomplished by effecting forward axial movement of the induction coil 20 along the housing 12 and the propellant charge as the combustion zone propagates forwardly through said charge after ignition at a rear end portion thereof. As stated, the heat which is added inductively to a radially extending portion or layer of the propellant charge adjacent the combustion zone may actually effect subsurface ignition, or, alternatively, the propellant in the portion or layer may merely be prepared by such added heat for quick subsequent ignition by heat conducted and radiated thereto from the combustion zone. In either event, the energy expended in heating the propellant inductively after ignition to effect a given amount or degree of overall burning rate acceleration is reduced when the propellant has been heated prior to ignition as described. Accordingly, it is preferred that both pre-ignition and postignition inductive heating be accomplished.

The electrical energy required for postignition or in-flight induction heating of the propellant charge 18 is supplied from an "airborne" power source 68 as shown. Said power source may, for example, comprise a thermionic generator and a frequency converter carried by the rocket assembly. The characteristics of the power source are such that the coil 20 may be connected thereto to provide an electromagnetic field of frequency and intensity which will result in inductive heating of the igniters in the propellant charge 18 in the manner described. Connection of the said coil and power source may be effected selectively by means of the aforementioned manual switch 62, said switch being adapted to connect the supply conductors 64 and 66 with lead conductors 70 and 72 extending from the source 68.

In order that the propellant charge 18 may be heated selectively beneath or adjacent a forwardly advancing or propagating combustion zone during postignition heating, it is necessary that the induction coil be moved axially forwardly from a first position around a rear end portion of said charge to a second position around a front end portion thereof. Further, such movement of the coil must take place at a selected rate. If the propellant charge is heated too far in advance of the combustion zone, exhaust nozzle pressures may be excessive and deep subsurface igntion may occur with disastrous results as mentioned above. On the other hand, a rate of movement of the coil which is too low will not result in the desired acceleration of burning rate.

A simplified exemplary control means 74 for postignition heating is shown in the drawing and said means comprises a control valve 76 which regulates the flow of pressurized gas to the aforementioned second or alternate supply conduit 54. Gas under pressure is supplied to the control valve 76 through a branch conduit 78 extending from a sensing conduit 80 communicating at one end with the entrance portion of the nozzle section 16 of the motor housing 12. The sensing conduit 80 communicates at its opposite end with a control or working chamber 82 in a valve actuator 84. Said actuator also has a spring chamber 86 containing a reference spring 88 which acts on a valve actuating diaphragm 90 urging the same upwardly as shown. Gas under pressure in the control or working chamber 82 also acts on the diaphragm 90 and urges the same downwardly in opposition to said spring. A link 92 connecting the diaphragm 90 with the valve 76 provides for flow regulating movements of said valve under the control of the diaphragm 90.

It will be apparent that the actuator 84 will operate to cause the valve 76 to regulate the flow of pressurized gas to the coil actuator 22 through the conduits 54 and 34 and the valve 38 so that the rate of forward movement of the coil 20 will be controlled in accordance with the combustion chamber or exhaust nozzle entrance pressure. An excessive nozzle entrance pressure will result in closing movement of the valve 76 and in a reduction in the rate of forward movement of the coil 20. Conversely, if the combustion chamber or nozzle entrance pressure is below that established by the reference spring 88, the flow of pressurized gas to the actuator 22 will be increased to increase the rate of forward movement of said coil.

In addition to the function described, it will be observed that the control means 74 provides a measure of thrust control in that thrust is dependent upon burning rate. Obviously, a much more sophicticated control means may be utilized to provide for variable or more precise thrust control, for on-off or ignition and shut-off operation and/or for additional safety features and it will be understood that such control means fall within the scope of the present invention.

The operation of the burning rate control and acceleration means of the invention should be clear from the foregoing and it is deemed necessary only to comment briefly on the manner in which switchover from preignition heating to postignition heating is accomplished. Swtching must of course be accomplished between the "ground" and "airborne" electrical power supplies and this may obviously be readily accomplished by means of the manual switch 62. The control means 74 and the aforementioned "ground" control means comprising the valves 38 and 40 are of course operable selectively. Switchover to postignition heating or "airborne" operation here may be readily accomplished by moving valve 38 to its aforementioned third position wherein it connects conduits 54 and 34 and by moving valve 40 to the position wherein it vents or exhausts conduit 36.

The invention claimed is:

1. In a solid propellant rocket motor or the like, the combination of an elongated generally cylindrical housing having an exhaust nozzle at a rear end portion, a generally cylindrical charge of a solid propellant containing electrically conductive particles disposed in said housing and adapted to be ignited at a rear end portion and to burn forwardly, an induction coil disposed around said housing so as to provide an electromagnetic field in a substantially radially extending layer of the propellant charge at said rear end portion thereof, an electrical power source connected with said coil and energizing the same so that the intensity and frequency of the electromagnetic field are such that the electrically conductive particles in the affected layer of the propellant charge are inductively heated to heat the propellant in said layer, and drive and control means for moving said induction coil longitudinally forwardly along the housing to heat successive substantially radial layers of the propellant charge as preceding layers of the charge are burned and to thereby accelerate the burning rate of the charge.

2. In a solid propellant rocket motor or the like, the combination of an elongated generally cylindrical housing having an exhaust nozzle at a rear end portion, a generally cylindrical charge of a solid propellant containing electrically conductive particles disposed in said housing and adapted to be ignited at a rear end portion and to burn forwardly, an induction coil disposed around said housing so as to provide an electromagnetic field in a substantially radially extending layer of the propellant charge at said rear end portion thereof, an electrical power source connected with said coil and energizing the same so that the intensity and frequency of the electromagnetic field are such that the electrically conductive particles in the affected layer of the propellant charge are inductively heated to heat the propellant in said layer, means for moving said induction coil longitudinally forwardly along the housing to heat successive substantially radial layers of the propellant charge as preceding layers of the charge are burned and to thereby accelerate the burning rate of the charge, and means responsive to pressure in said exhaust nozzle for controlling said last mentioned means so that the burning rate of the propellant charge is accelerated to provide for maximum thrust output of the motor without exceeding a safe pressure limit in said nozzle.

3. The combination of an elongated generally cylindrical rocket motor housing having an exhaust nozzle at a rear end portion, a generally cylindrical charge of a solid propellant containing electrically conductive particles disposed in said housing and adapted to be ignited at a rear end portion and to burn forwardly, an induction coil disposed around said housing so as to provide an electromagnetic field in a substantially radially extending layer of the propellant charge, a ground electrical power source connectible with said coil and adapted to energize the same so that the intensity and frequency of the electromagnetic field are such that the electrically conductive particles in the affected layer of the propellant charge are inductively heated to heat but not to ignite substantially all of the propellant in the layer, an airborne electrical power source connectible with said coil and adapted to energize the same so that the intensity and frequency of the electromagnetic field in the affected layer of the propellant charge are such that the electrically conductive particles in said layer are inductively heated to heat the remainder of the propellant in the layer, switch means for selectively connecting said ground and airborne power sources with said coil, actuating means for moving said induction coil longitudinally of the housing to positions around selected substantially radial layers of the propellant charge, and first and second selectively operable means for controlling the operation of said actuating means, said first selectively operable means serving to control said actuating means so that said coil with said ground power source connected thereto is moved at least once throughout the length of said propellant charge for preignition heating of the charge, and said second selectively operable means serving to control said actuating means so that said coil with said airborne power source connected thereto is moved from a first position around the aforesaid rear end portion of said propellant charge to a second position around a front end portion of said charge, the rate of forward movement of said coil between said first and second positions being controlled by said second selectively operable means so that the propellant charge is heated in a thin layer adjacent a forwardly propagating combustion zone after ignition.

References Cited in the file of this patent
UNITED STATES PATENTS

| | | |
|---|---|---|
| 1,301,381 | Buckingham | Apr. 22, 1919 |
| 2,393,541 | Kohler | Jan. 22, 1946 |
| 2,743,199 | Hull et al. | Apr. 24, 1956 |
| 2,870,309 | Capita | Jan. 20, 1959 |
| 2,918,004 | Denovan et al. | Dec. 22, 1959 |
| 3,022,735 | Eberle | Feb. 27, 1962 |